April 24, 1951  J. L. MAINWARING ET AL  2,550,643

STEAM TRAP

Filed Oct. 1, 1948

INVENTORS
John L. Mainwaring
Harold E. Campbell
BY Evans & McCoy
ATTORNEYS

Patented Apr. 24, 1951

2,550,643

UNITED STATES PATENT OFFICE 2,550,643

STEAM TRAP

John L. Mainwaring and Harold E. Campbell, Parma, Ohio, assignors to The Clark Manufacturing Company, Cleveland, Ohio, a corporation of Ohio Application October 1, 1948, Serial No. 52,202

2 Claims. (Cl. 137—103)

This invention relates to steam traps and in particular to an improved steam trap of simple and efficient design in which the outlet valve is controlled by a float of the inverted bucket type.

It is an object of the present invention to provide a steam trap in which the parts utilized to operate the outlet valve are of an improved and simplified design resulting in a unit which is easier to manufacture and which may be fabricated at lower cost but which at the same time will provide positive operation over long time periods.

Another object is to provide a steam trap in which the connections between the various moving parts have been simplified over the present commercial connections so that steam traps embodying the present invention may be easily manufactured and quickly and simply assembled. At the same time such connections are designed and made in such a manner as to facilitate detachability so that such operating parts can be disassembled without difficulty when it is desired to clean them or replace them.

Another object is to provide a steam trap in which the operating parts are manufactured so that the connections between them are easily detached but at the same time are designed so as to prevent inadvertent disassembly during operation.

Other objects and advantages of the present invention will become apparent from the following detailed description accompanied by the drawings in which.

Figure 1:
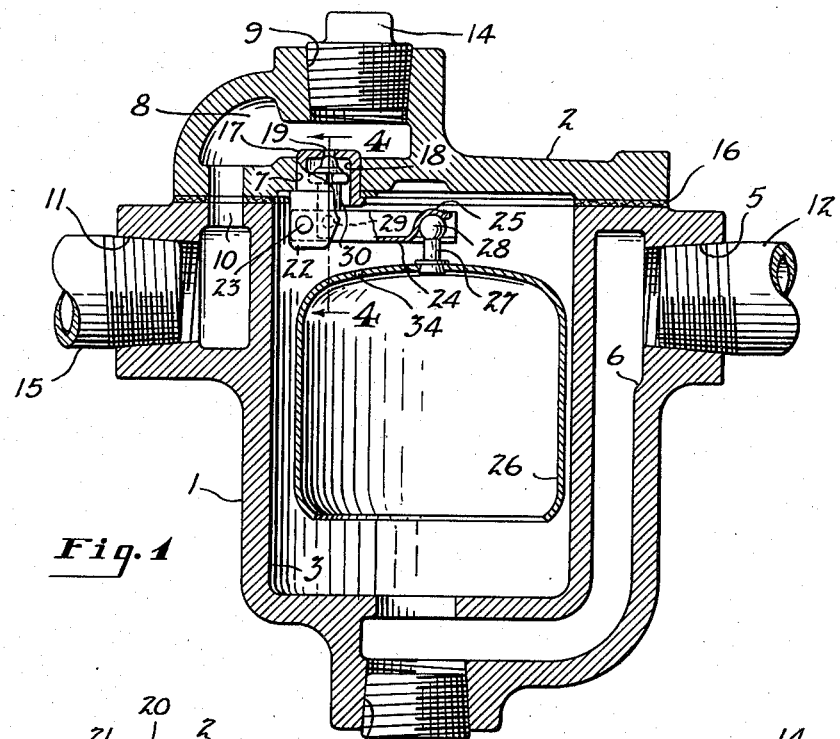
Figure 1 is an elevational sectional view with parts broken away, of a steam trap embodying the present invention.

In the embodiment of the invention illustrated in the drawings the steam trap comprises a body member 1 and a top 2. The base or body member 1 is provided with a hollow chamber 3 which is generally of a cylindrical form. The body 1 is provided with a vertically directed inlet 4 to the hollow chamber 3 and in addition with a horizontally directed inlet 5 which opens into a passage 6 formed in the body 1 and leading into the hollow chamber 3. Since the steam trap utilizes an inverted bucket type float it is essential that the inlet to the hollow chamber 3 be disposed below the float member so that incoming gases, etc., will flow from the inlet into the float.

Egress for the condensate accumulated by the steam trap is provided through an outlet port 7 which opens into an exhaust chamber 8 formed in the top of the steam trap. The chamber 8 is in communication with a vertically directed outlet 9 and also with a passage 10 leading to a horizontally directed outlet 11 which may be either formed in the top 2 or, as shown in the drawings, in the body 1 at a point substantially in alignment with the horizontal inlet 5.

Thus, it may be seen that the steam trap is adapted for connection into a pre-existing horizontal or vertical pipe line and the inlet and outlet passages which are not connected may be provided with screw plugs to close them or may be used as test holes or for the connection of a drain or the like.

Looking at Figure 1 it may be seen that an inlet pipe 12 is threadedly connected to the inlet 5 and carries water vapor and gases through the passage 6 to the hollow chamber 3 with the inlet 4 being closed by a threaded plug 13. On the outlet side of the trap the outlet 9 is shown as closed by a threaded plug 14, the trapped condensate being removed through exhaust chamber 8, passage 10 and outlet 11. A condensate drain pipe 15 is shown as being threadedly connected to the outlet 11.

The top 2 of the steam trap may be securely held to the body 1 in any suitable manner such as, for example, by bolts, not shown, which extend through flange portions of the top and the body portion and hold these two sections securely together. To prevent leakage at the joint between the top and the body of the steam trap, a gasket or gasket material indicated by numeral 16 may be utilized.

It has been found preferable to construct the operating parts of the steam trap mechanism in such manner that they are supported in the hollow chamber 3 of the body of the steam trap by being suspended from the underside of the top 2. By so doing when it becomes desirable to open the steam trap for maintenance or repair, the operating parts are removed with the top. Further, when the steam trap is connected in a horizontal line as shown in the drawings it is not necessary to remove the trap from the line to inspect or clean its interior or to make replacement of its moving parts.

Figure 2:
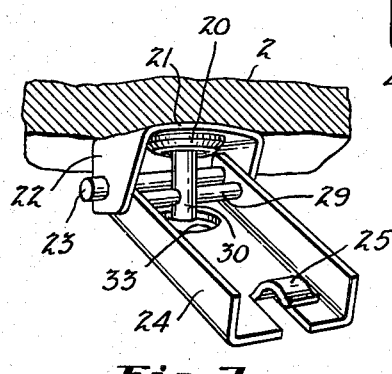
Fig. 2 is an enlarged perspective view of the operating parts which control the outlet valve to illustrate their operation and relation with each other.
Figure 4:
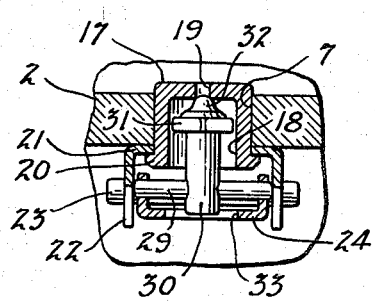
Figure 3:
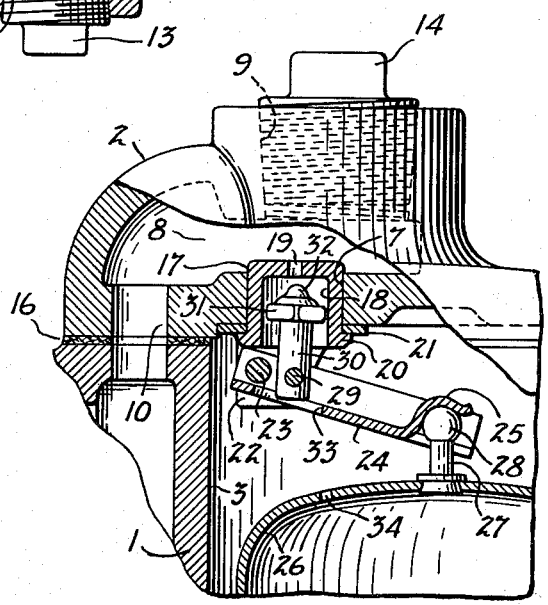
Fig. 3 is an enlarged fragmentary view of the steam trap shown in Figure 1, illustrating the relative position of the operating parts when the outlet valve is in an open position; and, Fig. 4 is an enlarged fragmentary sectional view taken substantially on line 4—4 of Figure 1.

To carry out this principle of construction, the outlet port 7 which opens from the hollow chamber 3 into the exhaust chamber 8 through the bottom wall of the top 2 is provided with a valve seat insert 17 which is preferably a hard metal member having a press fit with the marginal portions of the top surrounding the outlet port 7. The insert 17 may also be provided with an interior cylindrical passageway or bore 18 which terminates in a valve opening 19 as may best be seen in Figs. 3 and 4. At the open end of the valve seat insert, outwardly extending flange portions 20 may be provided so that when the insert 17 is pressed into the top 2 it will retain a supporting member or bracket 21 having depending lugs or ears 22 which extend downwardly into the hollow chamber 3 in spaced substantially parallel relation. Journaled in apertures in the ears 22 is a pivot pin 23 on which is pivotally mounted between the ears 22, an operating lever 24. This operating lever preferably has a channel shaped cross section which may best be seen in Fig. 2 and the pin 23 passes through the side flange portions of the channel shaped lever.

At the opposite end of the operating lever 24 a tongue 25 is struck from the base of the channel shape and curved with a rounded configuration. An inverted bucket float member 26, adapted to readily fit within the hollow chamber 3, carries at its top a spindle or spud 27 which terminates in an enlarged, rounded projection or ball 28. The tongue 25 struck from the operating lever 24 has a width approximately equal to the diameter of the spindle 27 so that it may be disposed within the side walls of the slit from which the tongue 25 was struck. The curve of the tongue 25 is complementary with that of the rounded projection or ball end 28 to provide a ball and socket type connection which permits free pivotal movement of the float with respect to the operating lever. However, the tongue 25 has its end portion slightly curved toward the base of the operating lever so that the rounded projection 28 is received in the socket formed by the tongue with a slight snap fit. Thus, the tongue 25 prevents disassembly of the float from the operating lever and requires that a slight pressure be exerted on the float to remove it without detracting from the free pivotal connection therebetween. The horizontal diameter of the float approaches the internal diameter of the hollow chamber 3 and is so proportioned with respect to the length of the operating lever 24 so that even in the lowermost position of the lever there is not sufficient space between the float and the walls of the hollow chamber to permit accidental detachment of the float from the operating lever.

Adjacent the pivot pin 23 by which the operating lever is pivotally mounted to the ears 22 of the supporting member 21, a second pivot pin 29 is disposed and this pivot pin has its end portions journaled in apertures in the side wall flange portions of the channel shaped operating lever 24. Also mounted on the pivot pin 29 is one end of a valve disk or member 30 which extends upwardly and is disposed within the cylindrical passage 18 of the valve seat insert 17. The member 30 is provided with a guide portion 31 which is dimensioned so as to permit a sliding fit with the interior surfaces of the passage or bore 18 of the valve seat insert 17 and maintain the member 30 in alignment with the valve opening 19. As shown in the drawings this guide portion 31 is rectangular providing four corner portions which may contact the valve seat insert to maintain alignment without materially restricting the flow of condensate through the passage 18 and into the drain pipe.

Above the guide portion 31 the member 30 is provided with a tapered or rounded end portion 32 of any suitable shape adapted to engage with and close the valve opening 19 in the valve seat insert 17. The valve end 32 or the complete member 30 is also preferably made of a hard metal to prevent undue wear between the end 32 and the margins of the valve opening 19 after a repeated contact therebetween.

As may be seen in the drawings, the end portions of the pivot pin 29 are disposed behind and closely adjacent to the depending ears or lugs 22 of the supporting member 21 so that it is not necessary to secure the pivot pin 29 to the operating lever 24 in any manner. The pivot pin 29 may have a loose sliding fit in the operating lever and will be retained against inadvertent disassembly by the ears 22 of the supporting member 21. The pivot pin 23 may, if desired, have enlarged head portions to prevent movement thereof with respect to the ears 22. However, if desired, this pin may be lengthened so that it can extend beyond the ears 22 in both directions and the walls of the hollow chamber 3 will prevent the possibility of disassembly of the pivot pin 23 from the ears 22.

It will also be noted that the operating lever 24 may be provided with an opening 33 therethrough in the region of the valve body 30 to facilitate passage of condensate accumulated by the trap from the hollow chamber 3 into the passageway or bore 18 of the valve seat insert 17 and through the valve opening 19. The opening 33 also permits the use of a longer valve member 30, if this is desired, since it may extend through the opening 33.

The float 26, is of the inverted bucket type, opening toward the bottom of the hollow chamber 3 to receive the flow of vapors and gases entering the chamber, and is provided with a vent opening indicated in the drawings by the numeral 34.

In operation of the trap, the condensate, steam, air and other vapor flow through the inlet pipe 12, the inlet 5, passage 6 and into the hollow chamber 3. The steam and air vapors trapped within the float 26 will make it sufficiently buoyant that it will be retained in an upward position such as that shown in Figure 1 in which the operating lever is substantially horizontal and holds the end 32 of the member 30 tightly against the valve opening 19 of the valve seat insert 17. As the steam or vapors condense within the float 26 due to the relatively cool liquid in the hollow chamber 3, the float 26 will tend to lose its buoyancy and will begin to descend, pivoting with respect to the operating lever due to the joint afforded by the ball end 28 of the spindle 27 and the associated tongue 25 of the operating lever 24. At the same time the operating lever will begin to pivot about the pivot pin 23, causing withdrawal of the member 30 from the valve opening 19 in the valve seat insert 17. This loss of buoyancy by the float is also facilitated by the escape of air, steam and vapors through the vent 34 of the float. As the float drops and opens the valve of the steam trap, the pressure in communication with the inlet pipe 12 will cause the discharge of the accumulated air and condensate through the trap outlet 11 and drain pipe 15. This discharge operation creates an accelerated flow of steam and air bubbles to the trap for accumulation in the hollow chamber 3 which again restores the buoyancy of the float 26, causing it to rise and close the outlet valve. The cycle then recommences by the condensation and venting of the steam and vapors from within the float until it again loses its buoyancy and begins a downward movement sufficient to open the discharge valve.

From the above it may be seen that the present invention provides a steam trap in which the operating parts are of simplified design and have simplified connections facilitating assembly and disassembly when necessary. At the same time the design of these parts has been such as to prevent any inadvertent disassembly or detachment of the operating parts when the steam trap is assembled and in its operating position.

The ball and socket type joint between the float and the operating lever, providing greater freedom of movement between these parts, has been found to be extremely satisfactory. It will also be noted that the design of the operating parts of the present steam trap are such that the cost of manufacturing may be appreciably reduced while obtaining an efficient and exceedingly sturdy construction. For example, the supporting member 21 and the operating lever 24 may be stamped from suitable thicknesses of sheet metal and the pivot pins may be lengths cut from suitable diameter wire.

It will be noted that the operating parts may be very easily and quickly assembled. The member 30 may be held in position with respect to the operating lever and the pivot pin 29 inserted through the side wall flanges of the channel shaped operating lever and through the member 30 to pivotally connect these two pieces together. Next, the end of the member 30 may be positioned within the bore 18 of the valve seat insert 17 which has previously been assembled together with the supporting member 21 to the top 2 of the steam trap. Then, with the side wall flange portions of the operating lever disposed between the ears 22 of the supporting member 21 the pivot pin 23 may be inserted through the apertures in the ears 21 and through the apertures in the side wall flanges of the operating lever. As soon as the side wall flanges of the operating lever are disposed between the ears 22 in position to receive pivot pin 23 the end portions of pivot pin 29 are held by the presence of the ears 22 against accidental disassembly from the operating lever. The ball end 28 of the spindle 27 of the float 26 may then be snapped into the socket afforded by the tongue 25 of the operating lever 24 and by lifting the top 2 the operating parts may be disposed within the hollow chamber 3 of the body 1 of the steam trap with the exhaust chamber 8 in register with the passage 10 of the outlet 11. The top and body of the steam trap may be secured together and the connections with the inlet and outlet pipes are ready to be made.

It will be understood that the foregoing description of preferred embodiments of the invention is for the purpose of explanation and illustration and variations and modifications may be made without departing from the spirit of the invention.

What we claim is:

1. A steam trap comprising a vertically disposed float chamber having a top wall provided with an opening laterally of the vertical center line of the chamber, an inverted bracket type float having vertical and limited lateral movements in said chamber, an insert in said opening having a restricted valve opening and a downwardly facing valve seat, said insert having a vertically disposed passageway below said seat that is open at its lower end, a valve member having an upper end portion guided in said passageway and a lower end portion projecting below said passageway, pivot lugs depending from said top wall on opposite sides of said insert, a lever of channel form wider than said passageway and having a web and vertical side flanges, said lever having one end disposed between said hinge lugs with its flanges straddling said valve member and its opposite end above the central portion of said float, said lever having an opening in its web beneath said insert to permit free flow of condensate to said passageway, a horizontal pivot pin supported at its ends in said pivot lugs and passing through the flanges of said lever, a universal thrust transmitting connection between the float and the opposite end of the lever, and a second pivot pin parallel to the first and adjacent thereto on the side thereof toward the float connected end of the lever, said second pivot pin being supported at its ends in the flanges of the lever and passing through said valve member, said second pin being disposed centrally over said web opening.

2. A steam trap such as defined in claim 1 in which said float has an axially disposed rigidly attached spindle projecting from its top and provided with an upper ball-shaped end, and in which the web of said lever has a slot in its free end of a width to receive said spindle but less than the diameter of the ball and a tongue struck up from said slot and bent to conform to the top of said ball to provide a universal thrust transmitting connection between said float and lever.

JOHN L. MAINWARING.
HAROLD E. CAMPBELL.

REFERENCES CITED

The following references are of record in the file of this patent:

UNITED STATES PATENTS

| Number | Name | Date |
|---|---|---|
| 1,060,999 | Marquarot | Apr. 29, 1913 |
| 1,901,200 | Strong | Mar. 14, 1933 |
| 1,960,999 | Kaye | May 29, 1934 |
| 2,005,926 | Armstrong | June 25, 1935 |
| 2,060,300 | Goldberg | Mar. 10, 1936 |
| 2,190,138 | Smith | Feb. 13, 1940 |